C. B. KURTZ.
POWER TRANSMISSION MECHANISM.
APPLICATION FILED MAY 22, 1915.
1,293,646.
Patented Feb. 4, 1919.
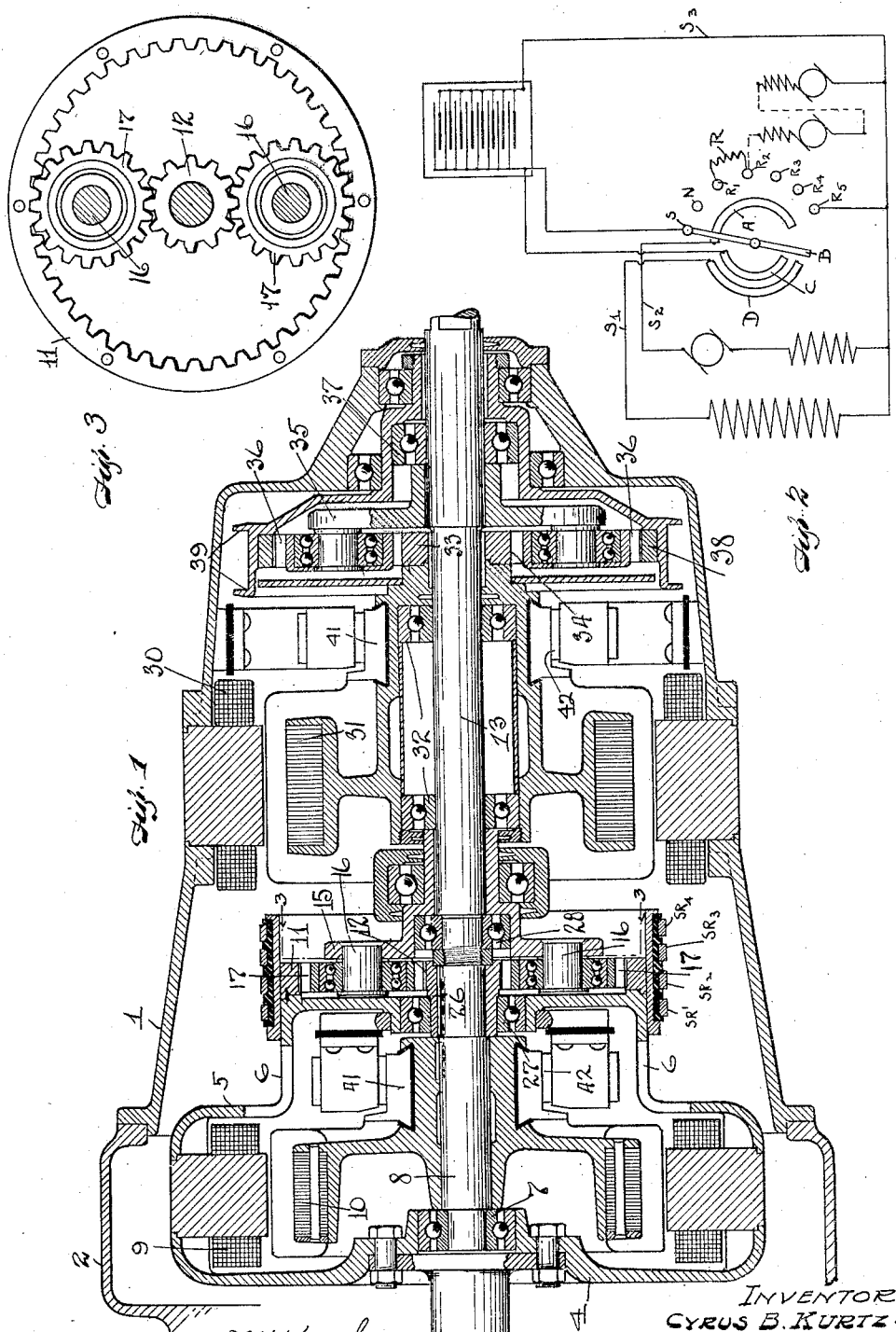
INVENTOR
CYRUS B. KURTZ.
BY Fay, Oberlin & Fay
ATTORNEYS
WITNESSES:
O. M. Kappler
Thos. H. Fay

UNITED STATES PATENT OFFICE.

CYRUS B. KURTZ, OF LAKEWOOD, OHIO.

POWER-TRANSMISSION MECHANISM.

1,293,646.    Specification of Letters Patent.    Patented Feb. 4, 1919.

Application filed May 22, 1915. Serial No. 99,031.

*To all whom it may concern:*

Be it known that I, CYRUS B. KURTZ, a citizen of the United States, and a resident of Lakewood, county of Cuyahoga, and State of Ohio, have invented a new and useful Improvement in Power-Transmission Mechanism, of which the following is a specification, the principle of the invention being herein explained and the best mode in which I have contemplated applying that principle, so as to distinguish it from other inventions.

The present invention relates to power transmission mechanism for use in vehicles or in the transmission of power where the driven load varies or where the torque required is continually changing. To accomplish this result, I have made use of two electric units in combination with differential mechanism between the engine and the driven shaft, so that the torque may be increased as is found necessary. By combining these elements with the fly wheel of an engine I have obtained a very compact mechanism and one of the electric units may be employed as a starting motor.

The annexed drawing and the following description set forth in detail certain mechanism embodying the invention, such disclosed means constituting, however, but one of various mechanical forms in which the principle of the invention may be used.

In said annexed drawing:—

Figure 1, is a sectional view through the present construction, showing my entire device; Fig. 2, is a diagrammatic view of the wiring; and Fig. 3, is a diagramatic sketch of the gearing taken on line 3—3.

Briefly stated, the invention consists in the use of two electric units, suitably connected by differential mechanism operating against reaction members, the latter being connected to the driven shaft and being held from rotating when the mechanism is used to start the engine. In the present device, as shown in Fig. 1, I show a housing 1 which will be attached to a crank case 2 of an engine and will extend rearwardly to carry the electric dynamos, clutch and differential mechanism, thus taking the place of the usual transmission unit. To the crank shaft 3 of an engine (not shown) I preferably bolt a fly wheel member 4 which will have an extending portion 5 with hand hole pinions 6 therein. To the forward end of the member 4 ball bearings 7 are attached which are designed to carry a floating shaft 8 which will be alined with the engine crankshaft 3.

In the fly wheel member, I preferably mount a dynamo electric member in the form of a field coil 9, and to the rear end of the member 4 an internal gear 11 is attached. A second and coöperative dynamo electric member in the form of an armature 10 is mounted on said floating shaft so as to be freely rotatable therewith and this armature 10 has a rearwardly extending portion 26 to which a small spur gear 12 is attached, this gear being alined with the large internal gear 11 carried by the member 4. The extending portion 26 of the armature is carried on ball bearings 27 mounted in the rear end of the member 4, in order to provide an antifriction mounting for the floating shaft 8 and the armature 10. These two dynamo electric members 9 and 10 form the first electric unit and are adapted to act as a clutch to transmit the power of the engine.

The driven shaft 13 is mounted in an antifriction bearing 28 which is mounted on the end of the floating shaft 8 and this driven shaft 13 has keyed or otherwise fastened thereto an annular flange or spider 15 in which are mounted a series of short stub shafts 16 carrying spur gears 17. These small spur gears mesh with the internal gear 11 and the small armature mounted gear 12. Thus the flange 15 bearing the stub shafts 16 serves as a reaction member during the starting action, when it is held from rotation in the manner to be presently explained.

Within the housing 1 to the rear of the first electrical unit, a second electrical unit is mounted, one dynamo electric member of this second unit in the form of a field coil 30 is carried by the housing and while the second coöperative dynamo element in the form of an armature 31 is freely rotatable about the driven shaft, being mounted upon ball bearings 32. This armature has a rearwardly extending tube or flange 33 carrying a small spur gear 34 similar to gear 12 of the first electric unit. Rigidly attached to the driven shaft by a key or like means is a flange or spider 35 which carries a series of stub shafts on which are mounted gears 36 in mesh with the gear 34. On bearings 37 a second flange is mounted so as to be rotatable and this flange has an internal gear 38 which meshes with the gears 36, and on the periphery of this flange a brake is adapted to be mounted between the small peripheral flanges 39 which will maintain the brake band in position.

The two armatures 10 and 31 have commutators 41 at the rear ends on which bear the usual brushes 42. Upon the fly wheel member 4, there are mounted a series of slip rings $SR_1$, $SR_2$, $SR_3$, and $SR_4$, which are contacted by the usual brushes. Three of these will be electrically connected to the field, the armature and the return wire or ground, the current carried to the second unit being taken from the common ring $SR_3$. In the form shown, the fourth ring is not employed but would be used where a plain series generator is employed in which case the two ends of the field and armature would be connected to the four rings.

When the dynamo is to be used as a starting motor the switch will be closed through the contact S. In this position, the circuit will be made from the battery, through the switch arm, and the contact S to the contact segment A, the armature and the series field of the dynamo and thence back to the battery through the return wire $S_3$. This closes the dynamo circuit and causes the dynamo to operate as a motor. To accomplish the cranking operation, it is necessary to hold the annular flange 15 from rotating, in which case the armature revolving will cause the field and the fly wheel of the engine to revolve, in the opposite direction, the speeds being dependent upon the value of the gear train.

When using the engine to drive the car, the switch will be moved counter clockwise, which will first close the exciting circuit through the end B of the switch arm, contact segments C and D, connections $S_1$, and back through the return or ground wire $S_3$. This builds up the field in the first unit and then further movement of the switch makes a closed circuit through the armature 10, series field of the first electrical unit, contact segment A, and the second electrical unit which will operate as a series motor. By further movement of the arm the motor will finally be cut out of the circuit entirely as when the arm contacts the point $R_5$.

With the second electrical unit or motor, I preferably employ a resistance "R" which will be in series with the two windings of the motor in the first position, that is when the switch arm is in contact with the point $R_1$. As the motor picks up in speed, first, the resistance R will be dropped from the circuit as shown when the switch arm is at the contact point $R_2$. Further changes in the motor circuit will be made as desired, and preferably the contact $R_3$ will indicate that the resistance R is connected in the circuit with the two windings in parallel, and when the contact is made through the point $R_4$, the two windings will still be in parallel, but the resistance R will be dropped from the circuit at the position finally taken with the switch arm at $R_5$, the second electrical unit will be entirely out of the circuit and the armature circuit of the first electrical unit will be closed directly through the return wire $S_3$. Thus having started the engine, to rotate the driven shaft, the switch member will be moved to make a contact with $R_1$, in which position the second unit will be in the circuit. At this time the field 9 will be revolving carrying the internal gear 11 therewith which in turn will rotate the gears carried on the stub shafts and thus rotating the small spur gear connected to the armature.

The difference in speed between the armature and field will create a current through the closed armature circuit and there will be a drag upon reaction member which will begin to rotate the driven shaft, thereby reducing the relative speed of the two electric elements.

As the reaction member drives the shaft the relative speed of the two electric elements of the first unit decreases, while the relative speed of the electric elements of the second unit increases until the two units balance. During this time, the current generated in the first unit will be sent into the second unit which will act as a motor. In this case as long as the internal gear 38 is kept from revolving, the rotation of the armature 31 and the gear 34 will drive the stub shafts and the flange 35 which is also keyed to the driven shaft. As there is a gear reduction here it will be seen that the power is transmitted to the shaft through two sets of gears thus increasing the torque. As the difference between the speeds of the armature 10 and field 9 will determine the current in the second unit, the torque of this unit will depend entirely on the relative speeds of the coöperative members of the first unit.

As the control circuit is changed, the final drive will occur where the second unit is out of the first armature circuit, at which point the brake will be released allowing the motor armature and gearing to float with the driven shaft. From this time on the drive will be through the first unit, the slip between the two members being sufficient to furnish enough current to keep the armature 9 revolving substantially with the field 10.

From this time on the drive will be entirely through the first unit, the reaction member turning at substantially the same speed as the field.

In the present device, the value of the gear train in the first electrical unit is three to one which means that the armature will revolve three times as fast as the field but in the opposite direction which means an actual 4 to 1 reduction. As the stub shafts transmit the torque, at no time can there be more than ¼ the torque transmitted through the electrical unit, that is the armature and the small spur gear. In this way it has been found possible to use an electrical unit of only one fourth the size required, were all the torque transmitted through the electrical clutch action, and yet all the advantages of electrical transmission are retained.

The second unit is simply a torque multiplier to be used in starting the heavy pulling when an increased torque is desired and is designed to take the place of the usual transmission gears now ordinarily used. By driving through a 4 to 1 reduction here, great torque can be obtained with a small electrical unit which is an important feature. A great saving in weight is obtained along with the advantages of the smooth electrical clutch action, and use can be made of a very small high speed electrical unit. In this connection, it will be readily apparent that a gear train of any desired value may be used depending on the torque to be transmitted and a gear train having a value of 4 to 1, or one of 5 or 6 to 1 can be submitted. As the final drive is substantially a direct drive, the gear train can be made of any value found most suitable.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination of a driving member, a driven member, two electrical units having relatively rotatable fields and armatures, and differential mechanism connecting said units with said driven member, one of said units being operable by said driving member.

2. The combination of a driving member, a driven member, two electrical units having relatively rotatable fields and armatures, and differential mechanism connecting said units with said driven member, one of said units being operable by said driving member and adapted to act as a generating unit.

3. The combination of a driving member, a driven member, two electrical units, one of said units having a rotatable field and armature, the other of said units having stationary field and a rotatable armature, and differential mechanism connecting said units with said driven member, one of said units being operable by said driving member and adapted to act as a generating member, the other of said units being operable by the current produced by said first unit.

4. The combination of a driving member, a driven member, an electric unit, having two coöperative electric elements, one of said elements being mounted on said driving member, the other being freely rotatable, differential mechanism connecting said two elements with said driven member, and a second electric unit adapted to be operated by the current produced in said first unit, and differential mechanism connecting said second unit to said driven member.

5. The combination of a driving member and a driven member; an electric unit consisting of a field element carried by said driving member and a freely rotatable armature element; differential mechanism operatively connecting said two electric elements with said driven member; a second electric unit consisting of a stationary field, and a rotatable armature; and differential mechanism connecting said armature to said driven member.

6. The combination of a driving member and a driven member; an electric generating unit consisting of a field element carried by said driving member and a freely rotatable armature element; planetary gearing connecting said two elements with said driven member; an electric motor unit consisting of a stationary field element and a rotatable armature element; planetary gearing connecting said motor armature element with said driven member, said motor unit being operated by the current produced in said generating unit.

7. The combination of a driving member and a driven member; an electric generating unit consisting of a field element carried by said driving member and a freely rotatable armature element; planetary gearing connecting said two elements with said driven member; an electric motor unit consisting of a stationary field element and a rotatable armature element; planetary gearing connecting said motor armature element with said driven member, said motor unit being operated by the current produced in said generating unit, and means for allowing said motor armature to revolve freely with said driven shaft.

8. The combination of a driving member and a driven member; an electric generating unit consisting of a field element carried by said driving member and a freely rotatable armature element; planetary gearing connecting said two elements with said driven member; said generating unit being adapted to act as an electrical clutch, the slip between the two elements determining the current output; an electric motor unit, consisting of a stationary field element and a freely rotatable armature element; planetary gearing connecting said motor armature element with said driven member; said motor unit being adapted to act as a torque multiplier and being operable on the current output of said generating unit; and means for freeing said armature unit when no current is employed in said motor unit.

Signed by me this 19th day of May, 1916.

CYRUS B. KURTZ.

Attested by—
MARY GLADWELL,
F. M. RECKTENWALT.

Copies of this patent may be obtained for five cents each, by addressing the "Commissioner of Patents, Washington, D. C."